March 31, 1959 S. SOLOWAY 2,880,373
APPARATUS FOR CONTROLLING GAS PRESSURE
Filed Dec. 21, 1953 2 Sheets—Sheet 1

INVENTOR.
SIDNEY SOLOWAY
BY
Campbell, Brumbaugh, Free & Graves
HIS ATTORNEYS.

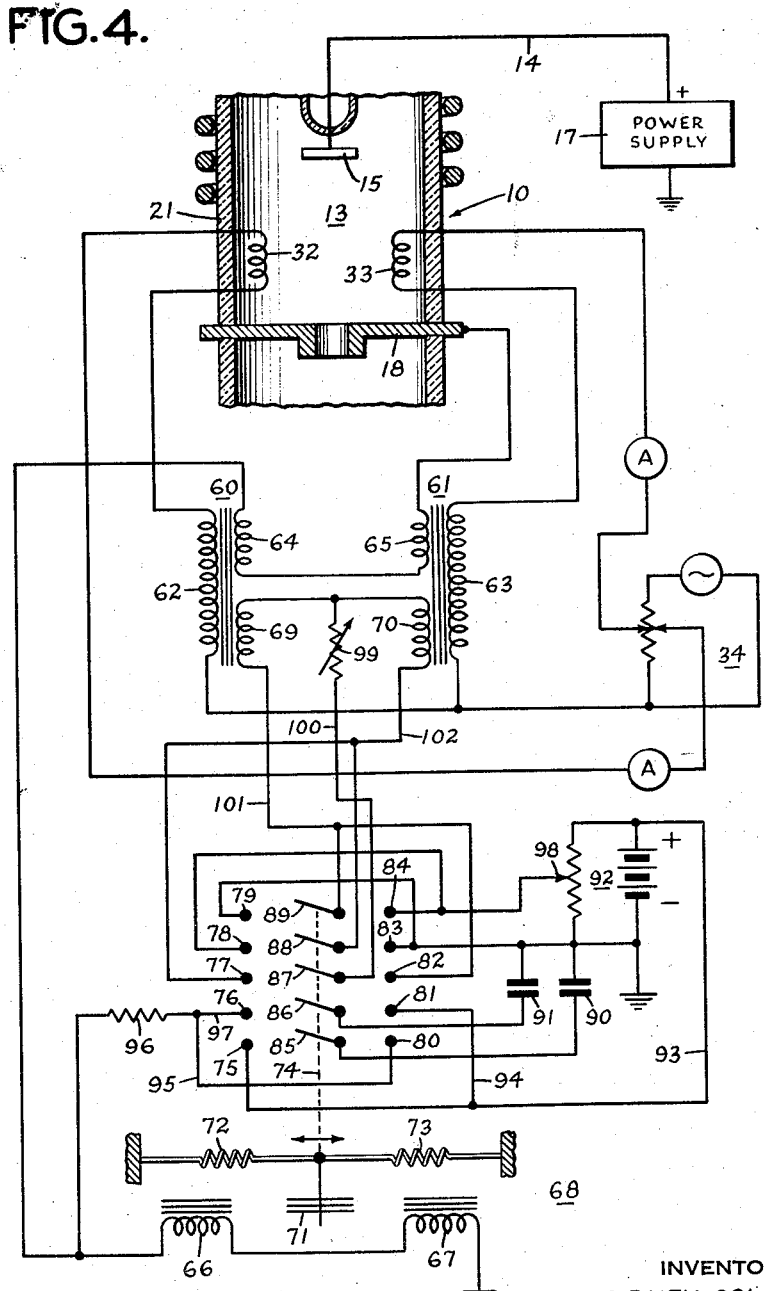

United States Patent Office 2,880,373
Patented Mar. 31, 1959

2,880,373

APPARATUS FOR CONTROLLING GAS PRESSURE

Sidney Soloway, Norwalk, Conn., assignor, by mesne assignments, to Schlumberger Well Surveying Corporation, Houston, Tex., a corporation of Texas Application December 21, 1953, Serial No. 399,505

10 Claims. (Cl. 315—108)

The present invention relates to apparatus for regulating the pressure of gases in sealed containers and more particularly to novel apparatus for controlling the pressure of hydrogen type gases in low pressure chambers such as are found in ion sources.

It has been common practice, heretofore, to regulate the gas pressure in a chamber by continuously feeding gas to and evacuating it from the chamber in order to maintain a desired pressure therein. Typical of the devices in which this technique has been employed are ion sources in which the pressure of an ionizable gas must be closely regulated for maximum operating efficiency. While this method is effective, it requires bulky evacuating and gas supply equipment and, therefore, is of little utility where space requirements are severely restricted, as in apparatus for use in bore holes, for example.

For such use, it has been proposed initially to fill the ion source chamber with gas at the desired pressure and to run it for short periods until the gas is depleted by ionization and by leakage into the low pressure accelerating tube, if one is being used. While this method of operation is effective in limited quarters such as bore holes, for example, it leaves something to be desired since the ion source has a rather short useful life due to the ever decreasing gas pressure therein.

Accordingly, it is an object of the present invention to provide novel apparatus for regulating the pressure of a gas in a chamber adapted for use in limited quarters.

Another object of the invention is to provide novel apparatus of the above character for maintaining a substantially constant pressure of a hydrogen type gas in a partially evacuated chamber without the necessity for an external gas supply and evacuating system.

A further object of the invention is to provide novel apparatus for maintaining a predetermined pressure of ionizable gas in an ion source.

These and other objects of the invention are accomplished by employing a plurality of controllable gas emitting and absorbing devices in a chamber wherein the gas pressure is to be regulated. These devices are preferably designed to emit gas upon being heated to one temperature range and to absorb gas upon being heated to another temperature range.

In a preferred embodiment of the invention, the devices take the form of filaments. At least one of these filaments is preferably initially saturated with the gas that is to be maintained at a predetermined pressure in the chamber, such filament being heated to its emission temperature, and at least another filament is heated to its absorption temperature. By properly regulating such filament temperatures, the gas may be maintained at the predetermined pressure.

These and other objects and advantages of the invention will be more easily understood when the following description is read with reference to the accompanying drawings in which:

Fig. 4 is a schematic diagram of a further embodiment of the invention applied to the ion source and particle accelerator shown in Fig. 1.

The invention will be described, for convenience, as it may be applied to an ion source. However, it is not to be construed as limited in application to ion sources since it may be employed in other devices wherein the pressure of hydrogen type gases such as, for example, hydrogen, deuterium or tritium, must be closely regulated.

Figure 1:
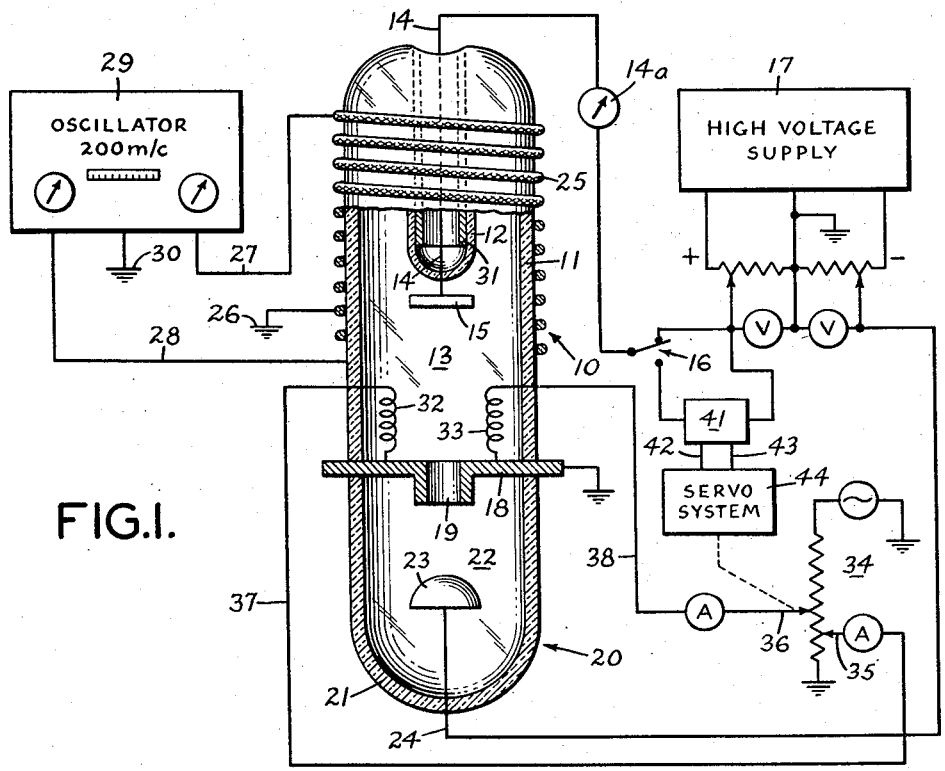
Fig. 1 is a schematic diagram of a typical gas control apparatus, according to the present invention, applied to an ion source and particle accelerator shown in longitudinal section.

In Fig. 1, an ion source 10 is constituted by an outgassed glass envelope 11, formed with a reentrant upper portion 12, defining a chamber 13. Suspended adjacent the tip of the portion 12 by a conductor 14 is a glass anode electrode 15, the conductor 14 being connected through a current indicating meter 14a such as a milliammeter and a switch 16 to a terminal at a positive potential of the order of 1 to 10 kv. on a high voltage source 17.

Found in the lower portion of the chamber 13 is a grounded metallic cathode electrode 18, designed to emit electrons in a conventional manner, such as by cold emission. Formed in the cathode 18 is a small port 19 through which ions may pass to an accelerating tube 20 comprising an outgassed glass envelope 21. The envelope 21 defines a chamber 22 having a target electrode 23 disposed therein opposite the port 19. The electrode 23 is preferably constructed of zirconium impregnated with tritium, and is maintained at the proper potential, as well as supported, by a conductor 24 which passes through the envelope 21 to a terminal at a negative potential of the order of 50 to 100 kv. on the high voltage supply 17.

Wound around the envelope 11 is an R.F. coil 25 grounded at a terminal 26 and connected by conductors 27 and 28 to a radio frequency oscillator 29 grounded at a terminal 30 and adapted to generate a signal having a frequency of the order of 200 megacycles per second. The reentrant portion 12 may be lined with a thin metallic sheet 31, which forms a capacitor with the upper section of the coil 25.

It is necessary, for maximum operating efficiency, to maintain a predetermined pressure of ionizable gas such as deuterium in the chamber 13. In conventional ion sources of this type, such pressure is maintained by continuously supplying gas from an external source and evacuating gas by an external pumping system to provide a constant internal pressure on the order of 1 to 10 microns of deuterium. This embodiment of the invention eliminates the necessity for both the external supply and evacuation systems by providing in the chamber 13 two selectively heated filaments 32 and 33, having characteristics such that one of the filaments may be saturated with gas such as deuterium and will emit such gas upon being heated to a predetermined temperature, whereas the other filament will absorb such gas upon being heated to another predetermined temperature. Zirconium filaments possess these characteristics and are preferably utilized, but it is to be understood that similar materials may be employed.

In this instance, the filament 32 is preferably initially saturated with deuterium, the gas to be regulated, and the filament 33 is substantially outgassed. An A.C.

power source 34 is connected by adjustable taps 35 and 36 and conductors 37 and 38 to the filaments 32 and 33, respectively, for heating these filaments.

Figure 2:
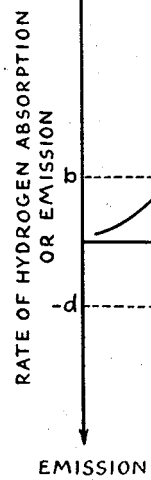
Fig. 2 is a graph helpful in explaining the operation of the embodiment of the invention disclosed in Fig. 1.

The graph shown in Fig. 2 will be of assistance in understanding the nature and characteristics of the zirconium filaments 32 and 33. The absorption emission rate vs. filament temperature (or filament current) characteristic of a zirconium filament for a source gas pressure of 4 microns is shown by the curve 40 in Fig. 2. Thus, at the temperature $a$, the zirconium filament will absorb deuterium at a rate $b$, while at a higher temperature $c$, the filament will emit deuterium at a rate $-d$. It is obvious that the gas pressure in the chamber 13 may be regulated by adjusting the temperatures of the filaments 32 and 33 so that the gas is simultaneously emitted by one of the filaments and absorbed by the other filament at individual rates. These rates may be varied together or separately in a direction opposing a change in pressure, thereby to maintain a predetermined, constant pressure.

In a typical operation of this embodiment of the invention, after deuterium gas is introduced at a desired pressure into the chamber 13, the temperature of the filament 32, which is directly related to the filament current, is adjusted for gas emission at a predetermined rate and the temperature of the filament 33 is adjusted for gas absorption at a rate found necessary to maintain the desired pressure in the chamber 13. Operation of the ion source 10 for a considerable period of time at top efficiency is now assured without the necessity of further attention to the gas supply.

It should be noted that the ammeter 14a may be employed as a pressure indicator, since the anode current of the ion source 10 will be proportional to the pressure in the chamber 13, assuming a constant anode-cathode potential. It should also be understood that other conventional pressure indicating devices may be employed to register the pressure in the chamber 13.

Upon establishment of the desired pressure in the chamber 13, and energization of the ion source 10, the electrons emitted by the cathode 18 will be attracted to the anode 15 due to the potential difference therebetween. However, the R.F. field created in the chamber 13 directly by the coil 25, and also by the field created due to the capacitor effect between the coil 25 and the metal foil 31, will influence the electrons to take an extended path between the cathode 18 and the anode 15. Such path multiplies the number of collisions between the electrons and the molecules of deuterium gas in the chamber 13, thereby generating a greater number of positive ions, commonly termed deuterons, which will be attracted through the port 19 and accelerated to a high velocity towards the target electrode 23. Since the target 23 contains tritium, the impingement of high velocity deuterons thereon will generate neutrons. Of course, a target impregnated with deuterium may be employed if neutrons resulting from deuterium-deuterium reactions are desired.

If automatic regulation of the gas pressure in the chamber 13 is desired, the temperature of the filament 32 or the filament 33, or both, may be varied as a function of the pressure in the chamber 13. Thus, as shown in Fig. 1, the switch 16 may be operated to place a current transformer 41 in the anode circuit of the ion source 10, such transformer being connected by conductors 42 and 43 to a conventional servo system 44. The servo 44 may comprise any conventional quick acting motor energized by an amplifier having its input connected to the conductors 42 and 43. The servo system is mechanically coupled to the tap 36 in order to adjust the current in the filament 33, thereby regulating the temperature of the filament. It is obvious that the filament 33 could be directly heated from a servo amplifier controlled by the output from the transformer 41, as could the filament 32.

In a representative operation of this modification of the invention, a predetermined current will flow at a given potential difference between the cathode 18 and the anode 15, and such current will be directly related to the gas pressure in the chamber 13. Therefore, any change in gas pressure will be sensed by the servo 44 through the current transformer 41, and the tap 36 will be accordingly adjusted to either increase or decrease the absorption of gas by the filament 33 to restore the desired pressure in the chamber 13.

It is within the scope of this invention to employ other varieties of pressure sensing devices, in association with the chamber 13, to regulate the pressure through a servo system. Furthermore, a second servo may be employed to adjust the tap 35 so that both the emission and absorption of gas in chamber 13 may be automatically controlled or, alternatively, either one controlled.

After a time, the filament 32 will become substantially exhausted and the filament 33 substantially saturated with gas. However, instead of replacing the filaments, their functions may be reversed by reducing the current through the filament 32 and increasing the current through the filament 33. Such a reversal of functions permits the extended use of the ion source 10 without the necessity for costly and time-consuming filament changes.

In the employment of this invention in the ion source 10, where the chamber 13 is employed in combination with the accelerator 20, some of the deuterium gas will leak through the port 19 into the chamber 22. If it is necessary to operate the accelerator with the chamber 22 substantially evacuated, a filament intended primarily for gas absorption may be placed in the chamber 22, in addition to the filaments in the chamber 13. Or, alternatively, a gas emission filament may be disposed in the chamber 13 and a gas absorption filament may be placed in the chamber 22. When these latter alternatives are employed, the accelerator tube is maintained at a lower pressure than the ion source chamber, a desirable condition.

It is again emphasized that the R.F. ion source described in connection with Fig. 1 is merely exemplary, and the invention may be employed to regulate the gas pressure in chambers such as those found in ion sources of the type disclosed in copending application Serial No. 275,932, filed March 11, 1952, by C. Goodman for "Neutron Well Logging," Serial No. 281,378, filed April 9, 1952, by J. T. Dewan for "Neutron Source for Well Logging Apparatus," as well as chambers employed in combined ion sources and accelerators of the type disclosed in copending applications Serial No. 296,916, filed July 2, 1952, by J. T. Dewan and C. Goodman for "Particle Accelerator," now U.S. Patent No. 2,735,019, and Serial No. 356,077, filed May 19, 1953, by C. Goodman for "Neutron Sources," now U.S. Patent 2,816,242.

While deuterium has been described as the ionizable gas in connection with Fig. 1, it should be understood, as mentioned above, that any of the hydrogen type gases may be employed as for example, hydrogen, to produce protons, deuterium to produce deuterons, and tritium to produce tritium ions. Furthermore, while zirconium has been described as the preferred material for the filaments 32 and 33, other material from the class of hydrogen absorbents, such as uranium or titanium may be employed. If desired, one of the filaments may be designed only to emit gas and another of the filaments designed only to absorb gas.

Furthermore, while the embodiment of the invention shown in Fig. 1 employs heated filaments, it is to be understood that comparable structures may be substituted therefor. For example, an indirectly heated corrugated envelope of the type disclosed in the aforementioned application Serial No. 296,916, filed July 2, 1952, by J. T. Dewan and C. Goodman for "Particle Accelerator,"

now U.S. Patent No. 2,735,019, may be utilized. Also, any convenient directly or indirectly heated structure formed from the materials described in connection with the filaments, may be used to advantage in absorbing and emitting the gas according to the present invention.

Figure 3:
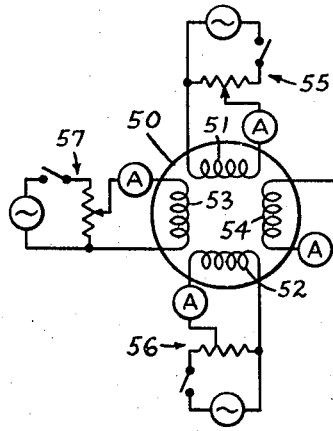
Fig. 3 illustrates in schematic form another embodiment of the invention permitting the controlled introduction of a plurality of gases into an envelope.

In another application of the invention illustrated in Fig. 3, a chamber may be alternately filled with different gases. A chamber 50, shown in outline form for simplicity, has disposed therein filaments 51 to 54, inclusive, associated with power sources 55 to 58, respectively. These filaments may be formed in the same manner as the filaments 32 and 33 described in connection with Fig. 1 with the exception that one of the filaments is saturated with deuterium and another of the filaments is saturated with tritium, for example, the remaining filaments being substantially outgassed.

In describing the operation of this embodiment of the invention, it will be assumed that the chamber 50 is initially evacuated. Filament 51, previously impregnated with deuterium, is heated by the current source 55 to its emission region. Upon reaching the desired pressure of gas in chamber 50, which may be indicated in any conventional manner as explained in connection with Fig. 1, the filament 52 may be heated to operate in its absorption region, thereby maintaining the desired pressure in the chamber 50. During this operation, the filaments 53 and 54 are inactive. Assuming it is now desirable to employ a gas other than deuterium in the chamber 50, the filament 51 is allowed to cool and the filament 52, previously heated to its absorption region, will remove substantially all of the deuterium in the chamber 50. After cooling the filament 52, a desired pressure of tritium may be provided in the chamber 50 by heating the filament 53, which has previously been impregnated with tritium, to its emission temperature range. Upon attaining the desired pressure of this gas, the filament 54 is heated to its absorption temperature range and the gas pressure thereby regulated in the chamber 50.

Since these operations may be repeated as often as desirable, the multiple gas chamber has broad utility, as for example, in neutron well logging. Thus, it may be desirable to record one type of log going down the bore hole, and another type of log coming up. This may be provided for by employing an ion source having a chamber similar to the chamber 50 wherein one type of gas may be employed in the ion source during descent and a second type of gas may be used during ascent in the bore hole.

The embodiment of Fig. 3 is subject, of course, to the modifications described in connection with Fig. 1. Thus, the functions of the filaments are reversible by adjustment of the power sources. Obviously, an appropriate servo system in combination with a pressure sensing device may be selectively associated with the filaments 51 to 54 as specifically described in connection with Fig. 1.

In Fig. 4, an alternative system for controlling the gas pressure in the ion source 10 of Fig. 1 is shown, and elements in this system similar to those found in Fig. 1 will be designated by like reference numerals. In the chamber 13, the initially saturated gas-emitting filament 32 and the gas-absorbing filament 33 are energized by the power source 34 through saturable reactors 60 and 61. As will be apparent from the discussion to follow, the reactors 60 and 61 are responsive to the discharge current between the anode 15 and the cathode 18 in the ion source 10 for controlling the current flow through the filaments 32 and 33 and, accordingly, the temperatures thereof.

The saturable reactors 60 and 61, of conventional construction, include windings 62 and 63, respectively, which represent impedances of controllable value connected in series circuit relation with the filaments 32 and 33, respectively. Control windings 64 and 65 of the reactors 60 and 61 are connected in a series circuit including the power supply 17, the anode 15, the cathode 18, the coils 65 and 64, and coils 66 and 67 of a relay 68. The saturable reactors 60 and 61 also include current windings 69 and 70 connected to the relay 68 as explained hereinafter.

The relay 68 consists of the iron cored coils 66 and 67 actuating an armature 71 therebetween. A pair of springs 72 and 73 will, in the absence of current flow through one of the coils 66 and 67, hold the armature 71 in an intermediate position as shown in Fig. 4. Mechanically joined to the armature 71 by a linkage 74 and actuated between stationary contacts 75 to 79, inclusive, and 80 to 84, inclusive, are movable contact members 85 to 89, inclusive. Since the armature 71 will remain in engagement with either of the cores of the coils 66 and 67 as long as current of a predetermined magnitude flows therethrough, it is apparent that the relay 68 is of the bistable type. As soon as the current through the coil attracting the armature 71 falls below the predetermined value, the spring tension exerted by one of the springs 72 or 73 will become greater than the magnetic force of attraction and will initiate movement of the armature 71 toward the other coil. The inertia of the armature 71 will cause it to swing past the center position so that the movable contact members 85 to 89 will engage the other set of relay contacts.

In order to hold the armature 71 at a new position, a pair of condensers 90 and 91 are connected to the movable contact members 85 and 86, respectively, and to the grounded negative terminal of a power source 92, shown as a battery. The positive terminal of the source 92 is joined by conductors 93 and 94 to the relay contacts 75 and 81, respectively, to charge the condensers 90 and 91 as the movable contact members 85 and 86 engage the contacts 75 and 81, respectively. Thus, as the armature 71 swings from the coil 66 to the coil 67 and the movable contact member 85 engages the contact 80, the charged condenser 90 will discharge through a conductor 95, a resistor 96 and the coils 66 and 67 to hold the armature 71 in engagement with the coil 67 for a short interval. Similarly, as the armature 71 swings from the coil 67 to the coil 66 and the movable contact member 86 engages the contact 76, the charged condenser 91 will discharge through a conductor 97, the resistor 96 and the coils 66 and 67 to hold the armature 71 in engagement with the coil 66.

The current windings 69 and 70 are selectively joined to a potentiometer 98, connected across the source 92, by the movable contact members 88 and 89 engaging the contacts 78, 83 and 79, 84, respectively. It will be apparent that this arrangement provides for reversing the direction of current flow through the windings 69 and 70.

An adjustable resistor 99 is connected to the junction of the coils 69 and 70 and joined by a conductor 100 to the movable contact member 87 which is associated with the fixed contacts 77 and 82, connected by conductors 101 and 102 to the remaining terminals of the coils 69 and 70, respectively.

When the armature 71 engages the core of the coil 66 and the movable contact members 85 to 89 engage the contacts 75 to 79, the coils 64 and 69 are connected in their respective energizing circuits so that the resultant magnetic fields are in opposing relation, whereas the coils 65 and 70 are connected so that their magnetic fields are in an aiding relationship. Thus, in this operating arrangement which will be referred to as a first operating condition, the impedance of the coil 62 varies directly with the current in the coils 64 and 65 while the impedance of the coil 63 varies inversely therewith. It will be apparent that the converse is true when the movable contact members 85 to 89 engage the contacts 80 to 84 and cause the current flow to reverse in the windings 69 and 70, such an arrangement being referred to as a second operating condition.

In a typical operation of the embodiment of the invention shown in Fig. 4, the armature 71 is manually displaced to a first position in which the movable contact members 85 to 89 of the relay 68 engage the left-hand set of fixed contacts 75 to 79. This effects the first operating condition for the system referred to above. Next, the potentiometer 98 and the variable resistor 99, shunted across the coil 70 in the first operating condition, are adjusted so that the current flow in the filament 32 results in an operating temperature designated $a$ in the graph of Fig. 2, and the current flow through the filament 33 produces an operating temperature intermediate the temperature $c$ and the point at which the curve 40 intercepts the horizontal axis of Fig. 2.

If the pressure in the chamber 13 increases, an increase in current flow between the anode 15 and the cathode 18 occurs resulting in an increased current flow in the coils 64 and 65. This current change causes the impedance of the coil 62 to increase and the impedance of the coil 63 to decrease. Accordingly, the filament 32 becomes cooler and emits less gas than it did prior to the variation in pressure, and the filament 33 becomes hotter and absorbs more gas. Conversely, a decrease in pressure causes the filament 32 to emit more gas and the filament 33 to absorb less. Therefore, automatic control of the gas pressure in the chamber 13 is assured.

Since gas is continually emitted by the filament 32 in the first operating condition of the system, it eventually becomes substantially exhausted while the filament 33 becomes loaded with gas. Under these circumstances, it is apparent that the automatic pressure control system will be unable to maintain the pressure in the chamber 13 and the current between the anode 15 and the cathode 18 will drop materially. Due to this drop in current, the magnetic field at the core of the coil 66 becomes insufficient to resist the bias of the spring 73 and the armature 71 is carried into engagement with the core of the coil 67. The condenser 90, which has been charged from the source 92 via the contacts 75 and 85, is now connected by the contacts 80 and 85, the conductor 95 and the resistor 96 to the coils 66 and 67. The charge on the condenser 90 thus provides energy by means of which the coil 67 produces a magnetic field to hold the armature 71 against its core, despite the bias of the spring 72.

In this second relay position wherein the movable contacts 85 to 89 are in engagement with the right-hand set of fixed contacts 80 to 84, the current to the coils 69 and 70 is reversed and the resistor 99 is shunted across the coil 69 instead of the coil 70. Accordingly, the second operating condition for the system is obtained wherein the roles of the filaments 32 and 33 are reversed. Automatic pressure control is provided in the same manner as described above, but with the filament 32 acting as a gas absorber and the filament 33 performing as a gas emitter.

In this second operative condition, the condenser 90 gradually discharges, but pressure is restored in the chamber 13 so that the current flowing between the anode 15 and the cathode 18 increases to the original value. This current, of course, flows through the coils 66 and 67 of the relay 68 and the resulting magnetic field at the core of the coil 67 is sufficient to maintain the armature 71 in its right-hand position in opposition to the bias of the spring 72. It is significant to note that while the same magnetic field strength exists at the core of the coil 66, the proximity of the armature 71 to the core of the coil 67 causes the magnetic field at this core to be the controlling one.

In the second operating condition for the system the condenser 91 is charged via the contacts 81 and 86 from the source 92 and, almost immediately, the system is readied for another alternation. Thus, if for any reason a pressure drop is signaled by a decrease in current flow in the coils 66 and 67, the armature 71 moves to the left and is maintained in engagement with the core of the coil 66 by the discharging of the condenser 82 therethrough. This returns the system to its first operating condition described above.

It is evident that the control system of Fig. 4 affords automatic pressure control as well as automatic reversal of the filaments 32 and 33 in the roles of the emitting and absorbing filaments. Accordingly, the useful life of the ion source 10 is materially increased.

It should be understood that the apparatus described herein are illustrative only and numerous modifications will suggest themselves within the scope of the invention. Therefore, the embodiments described above and shown in the drawing are not to be regarded as limiting the scope of the appended claims.

I claim:

1. Apparatus for maintaining a predetermined pressure of a gas of atomic number 1 and atomic weight within the range 1 to 3 in a chamber comprising a pair of devices in the chamber, each of said devices emitting the gas upon being heated to one temperature range and absorbing the gas upon being heated to another temperature range, means for selectively heating said devices to cause one device to emit the gas and the other device to absorb the gas, and control means responsive to a predetermined change in the gas pressure in the chamber occurring when the emitting device has become outgassed or the absorbing device has become saturated for reversing the emitting and absorbing functions of the pair of devices to initiate another emission-absorption regulation cycle substantially to maintain the predetermined gas pressure in the chamber.

2. Apparatus for selectively introducing a plurality of gases of atomic number 1 and atomic weight within the range 1 to 3 at predetermined pressures into a chamber comprising a plurality of pairs of filaments in the chamber, one of said filaments in each of said pairs being initially saturated with one of said gases and emitting said one gas upon being heated to a predetermined temperature range, one of said filaments in each of said pairs being initially outgassed and absorbing said one gas upon being heated to a predetermined temperature range, means for selectively heating each of the emitting filaments to emit one of the gases and each of the absorbing filaments to absorb one of the gases, and control means responsive to a predetermined change in the gas pressure in the chamber occurring when the emitting filament in one of said pairs of filaments has become outgassed and the corresponding absorbing filament has become saturated for reversing the emitting and absorbing functions of the one pair of filaments to initiate another emission-absorption regulation cycle substantially to maintain the predetermined pressure of one of the gases in the chamber.

3. Apparatus for selectively introducing a plurality of gases at predetermined pressures into a chamber comprising a plurality of groups of filaments in the chamber, at least one of said filaments in each of said groups emitting one of said gases upon being heated to a predetermined temperature range and at least one of said filaments in each of said groups absorbing said one gas upon being heated to a predetermined temperature range, and means for selectively heating said filaments including control means responsive to the gas pressure in the chamber for controlling the temperature of at least one of said filaments.

4. Apparatus for maintaining a predetermined pressure of a gas of atomic number 1 and atomic weight within the range 1 to 3 in a chamber comprising a plurality of filaments in said chamber, said filaments emitting the gas upon being heated to one temperature range and absorbing the gas upon being heated to another temperature range, means for heating said filaments including energizing circuits, a pair of saturable reactors, a winding of the first of said reactors being connected in the energizing circuit for one of said filaments, a winding of the second of said reactors being connected in the energizing circuit for another of said filaments, and means responsive to the gas pressure in said chamber for controlling the reactance of said saturable reactors.

5. Apparatus for maintaining a predetermined pressure of a gas of atomic number 1 and atomic weight within the range 1 to 3 in a chamber comprising a pair of filaments in said chamber, said filaments emitting the gas upon being heated to one temperature range and absorbing the gas upon being heated to another temperature range, means for heating said filaments including energizing circuits to initially provide for gas emission by one of said filaments and gas absorption by the other of said filaments, a pair of saturable reactors, a winding of the first of said reactors being connected in the energizing circuit for one of said filaments, a winding of the second of said reactors being connected in the energizing circuit for the other of said filaments, first means responsive to the gas pressure in said chamber for controlling the reactance of said saturable reactors, and second means responsive to a predetermined decrease in the gas pressure in said chamber to provide for gas absorption by said one filament and gas emission by said other filament.

6. In an ion source having an anode and a cathode at different potential levels in an envelope containing a gas of atomic number 1 and atomic weight within the range 1 to 3, the combination comprising a plurality of filaments in said envelope, said filaments emitting the gas upon being heated to one temperature range and absorbing the gas upon being heated to another temperature range, and means for selectively heating said filaments including control means responsive to the gas pressure in the envelope for controlling the temperature of at least one of said filaments so that the gas in the envelope is substantially maintained at a predetermined pressure.

7. In an ion source having an anode and a cathode at different potential levels in an envelope containing a gas of atomic number 1 and atomic weight within the range 1 to 3, the combination comprising a plurality of devices in said envelope, each of said devices emitting the gas upon being heated to one temperature range and absorbing the gas upon being heated to another temperature range, and means for selectively heating said devices including control means responsive to the gas pressure in the envelope for controlling the temperature of said devices so that the gas in the envelope is substantially maintained at a predetermined pressure.

8. In an ion source having an anode and a cathode maintained by a source of power at different potential levels in a gas filled envelope containing a gas of atomic number 1 and atomic weight within the range 1 to 3, the combination comprising a pair of filaments in the envelope, each of said filaments emitting the gas upon being heated to one temperature range and absorbing the gas upon being heated to another temperature range, means for selectively heating said filaments to cause one filament to emit the gas and the other filament to absorb the gas, and control means responsive to the current supplied to said anode by said source of power for controlling the temperature of said filaments in the envelope substantially to maintain a predetermined gas pressure in the envelope.

9. In apparatus including an ion source having an anode and a cathode at different potential levels in an envelope containing a gas of atomic number 1 and atomic weight within the range 1 to 3 and a particle accelerator having a chamber communicating with the envelope, the chamber containing a target electrode at another potential level, the combination comprising a pair of filaments in the envelope and the chamber, each of said filaments in the envelope emitting the gas upon being heated to one temperature range and absorbing the gas upon being heated to another temperature range, and means for selectively heating said filaments so that the gas in the envelope is substantially maintained at a predetermined pressure.

10. In an ion source having an anode and a cathode at different potential levels in an envelope containing a gas of atomic number 1 and atomic weight within the range 1 to 3, the combination comprising a pair of filaments in the envelope for emitting the gas upon being heated to one temperature range and absorbing the gas upon being heated to another temperature range, means for heating said filaments including energizing circuits to initially provide for gas emission by one of said filaments and gas absorption by the other of said filaments, a pair of saturable reactors, a winding of the first of said reactors being connected in the energizing circuit for one of said filaments, a winding of the second of said reactors being connected in the energizing circuit for the other of said filaments, a further winding on each of said saturable reactors responsive to the anode cathode current in said ion source for controlling the reactance of said saturable reactors, and means including a switching device for controlling the initial saturation of each of said reactors, said switching device repeatedly responsive to a predetermined decrease in the gas pressure for reversing the saturation of said reactors to thereby cause the repeated reversal of the emission and absorption functions of said one filament and said other filament.

References Cited in the file of this patent

UNITED STATES PATENTS

| | | |
|---|---|---|
| 1,334,143 | Dushman | Mar. 16, 1920 |
| 1,778,508 | Peoples | Oct. 14, 1930 |
| 2,056,464 | Jones | Oct. 6, 1936 |
| 2,454,564 | Nelson | Nov. 23, 1948 |
| 2,504,772 | White | Apr. 18, 1950 |

FOREIGN PATENTS

| | | |
|---|---|---|
| 9,233 of 1915 | Great Britain | May 11, 1916 |
| 619,133 | Great Britain | Mar. 4, 1949 |